United States Patent
Tiwary et al.

(10) Patent No.: US 10,812,409 B2
(45) Date of Patent: Oct. 20, 2020

(54) NETWORK MULTI-TENANCY FOR CLOUD BASED ENTERPRISE RESOURCE PLANNING SOLUTIONS

(71) Applicant: SAP SE, Walldorf (DE)

(72) Inventors: Mayank Tiwary, Rourkela (IN); Sunil Kumar, New Delhi (IN); PankajKumar Agrawal, Jamshedpur (IN)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 16/001,271

(22) Filed: Jun. 6, 2018

(65) Prior Publication Data

US 2019/0379612 A1   Dec. 12, 2019

(51) Int. Cl.
| | |
|---|---|
| *H04L 12/927* | (2013.01) |
| *H04L 12/917* | (2013.01) |
| *H04L 12/24* | (2006.01) |
| *H04L 12/851* | (2013.01) |
| *H04L 12/863* | (2013.01) |
| *H04L 12/841* | (2013.01) |
| *H04L 12/715* | (2013.01) |

(52) U.S. Cl.
CPC ........ *H04L 47/805* (2013.01); *H04L 41/0896* (2013.01); *H04L 41/142* (2013.01); *H04L 41/16* (2013.01); *H04L 47/24* (2013.01); *H04L 47/283* (2013.01); *H04L 47/50* (2013.01); *H04L 47/76* (2013.01); *H04L 45/64* (2013.01)

(58) Field of Classification Search
CPC ..... H04L 47/805; H04L 41/142; H04L 41/16; H04L 47/24; H04L 47/50; H04L 47/76; H04L 45/64
USPC ........................................................ 709/226
See application file for complete search history.

(56) References Cited

U.S. PATENT DOCUMENTS

| | | | | |
|---|---|---|---|---|
| 8,532,839 | B2* | 9/2013 | Drees ................ | H02J 13/00002 700/305 |
| 2002/0150044 | A1* | 10/2002 | Wu ........................ | H04L 47/15 370/229 |
| 2003/0058277 | A1* | 3/2003 | Bowman-Amuah ........................ | G06F 16/289 715/765 |
| 2004/0064351 | A1* | 4/2004 | Mikurak .............. | G06Q 10/087 705/22 |

(Continued)

*Primary Examiner* — Minh Chau Nguyen
(74) *Attorney, Agent, or Firm* — Buckley, Maschoff & Talwalkar LLC

(57) ABSTRACT

Some embodiments are associated with multi-tenant software defined data center network traffic management. A data center computing system may assign a first priority to a first traffic flow, associated with a first customer, using a regression technique based on a first response time of a first query associated with the first traffic flow. The system may assign a second priority to a second traffic flow, associated with a second customer, using the regression technique based on a second response time of a second query associated with the second traffic flow. The system may then dynamically allocating network resources to the first and second traffic flows based on the first and second priorities. Some embodiments may establish a plurality of network device queues and calculate demand-supply scores for the first and second traffic flows. The first and second traffic flows may then be sent to queues based on the calculated demand-supply scores.

17 Claims, 16 Drawing Sheets

(56) References Cited

U.S. PATENT DOCUMENTS

2017/0006135 A1* 1/2017 Siebel .................. G06F 8/10

* cited by examiner

| QUERY 702 | RESPONSE TIME (MS) 704 | WAIT TIME (MS) 706 | CPU TIME (MS) 708 | MEMORY USED 710 | ... | TRANSFERRED kBYTES 712 |
|---|---|---|---|---|---|---|
| Q1 | 33.0 | 0.0 | 20.3 | 7.5 | | 3.4 |
| Q2 | 2,000.9 | 1.2 | 12.0 | 8.0 | | 0.3 |
| Q3 | 500.3 | 0.0 | 51.6 | .6 | | 1,700.5 |

NETWORK MULTI-TENANCY FOR CLOUD BASED ENTERPRISE RESOURCE PLANNING SOLUTIONS

TECHNICAL FIELD

This document generally relates to methods and systems for use with computer devices, including networked computing devices. More particularly, this document relates to systems and methods to support network multi-tenancy for cloud based Enterprise Resource Planning ("ERP") solutions.

BACKGROUND

Network virtualization is used to increase the configurability of network appliances, such as routers, switches, etc., that make up a computing network. Control plane components, often implemented in software, provide instructions to data plane components, such as hardware network appliances. The instructions provide the network appliances with rules for treating incoming packets.

BRIEF DESCRIPTION OF DRAWINGS

The present disclosure is illustrated by way of example and not limitation in the following figures.

FIG. 7 is an example of values of query attributes used for testing associated with a general regression neural network.

DETAILED DESCRIPTION

Figure 1:
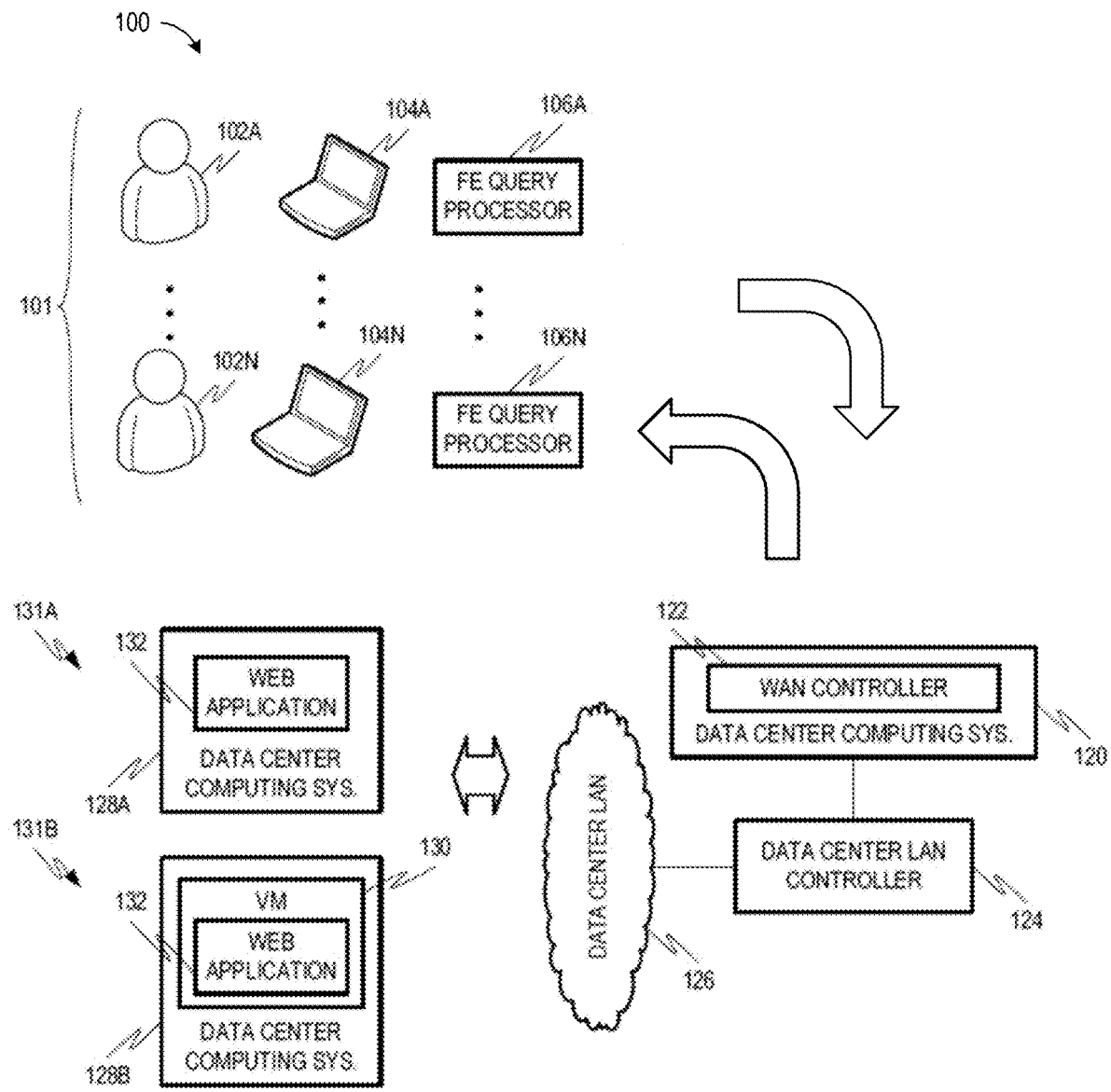
FIG. 1 is a diagram showing one example of an environment for implementing network virtualization for web application queries.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for implementing network virtualization in a web application environment. In a web application environment, a web application executes at a web application machine, which may be a physical or virtual machine. A user of the web application accesses the web application, for example, through a web browser executing at a user computing device. The user, through the web browser, sends a query to the web application requesting that the web application perform a particular processing task. The web application performs the requested processing task and sends a query reply back to the requesting user.

One example of a web application environment is the Business One Cloud suite of applications available from SAP SE of Waldorf, Germany. A user may have a set of queries that the user is permitted to make of the web application. When the web application includes an ERP application, such as the Business One Cloud suite of applications, example queries may include a request to view a purchase order, a request to view an inventory status, a request to add an invoice to an invoice record, etc.

In various examples, users of the web application are associated with different tenants. Tenants include businesses or other organizations that utilize the web application. Users associated with a tenant may include employees, contractors, or other individuals associated with the organization. In one example, a tenant business may utilize an ERP web application to manage its accounts receivable. Employees of the tenant business may be users who are permitted to send queries to the ERP web application, for example, to enter an account receivable, to check the status of certain accounts receivable, etc. ERP and other types of web applications may respond to queries of this type and other types, for example, depending on the particular implementation.

A tenant may maintain internal network infrastructure, such as a tenant LAN, from which users associated with the tenant may access the web application. Accordingly, a user query may traverse several networks between the user's computing device and the web application machine. These networks may include, for example, a tenant LAN maintained by the tenant, a WAN such as the Internet, a data center LAN maintained at the data center that implements the web application machine, etc.

The number and mix of queries directed to a web application may change over time. For example, not all users of the web application are active at any given time. Also, user permissions may change with time. For example, a user that is not permitted to make a particular query at one time may later be permitted to make that query. This means that static network configurations may not always operate at an acceptable level of efficiency.

Various examples described herein implement network virtualization to allow one or more of the networks traversed by web application queries to be configured based on how the web application is being queried at any particular time. This may increase the efficiency of the networks for the web applications.

Users may access the web application from user computing devices that execute a front-end query processor. When the user makes a query, the front-end query processor sends the query to the web application machine that is executing the web application as a query message. The front-end query processor may direct the query message to a particular port of the web application machine, such as a Transport Control Protocol ("TCP") port. The selected port may indicate a type of the query. For example, the front-end query processor may direct query messages including queries of a first type to a first port of the web application machine; it may direct query messages including queries of a second type to a second port of the web application machine, and so on.

Various network controllers may be programmed to modify network appliances of the various networks transporting query messages to direct and prioritize the packets making up the query message. (Packets making up a query message are also referred to herein as query message packets.) For example, a tenant LAN controller may configure network appliances of the tenant LAN to assign query message packets to one of a set of queues. The particular queue to which a query message is assigned may be determined, for example, by the query type (e.g., indicated by the port to which the query message is directed). A WAN controller may configure network appliances of the WAN to select network paths for query message packets, for example, based on query type (e.g., indicated by the port to which the query message is directed, the queue to which the tenant LAN assigned query network packets, etc.) A data center LAN controller may configure network appliances of the data center LAN to direct query message packets, for example, based on query type, user, tenant, etc.

FIG. 1 is a diagram showing one example of an environment 100 for implementing network virtualization for web application queries. The example shown in FIG. 1 shows a single tenant 101, including users 102A, 102N, user computing devices 104A, 104N, front-end query processors 106A, 106N executing at the user computing devices 104A, 104N. The components might communicate, for example, via a tenant LAN and related infrastructure. In various examples, however, additional tenants may be included in the environment 100. Also, in different examples, tenants may include more, fewer, and/or different arrangements of components than what is shown in FIG. 1.

Users 102A, 102N utilize user computing devices 104A, 104N to send queries to a web application 132, which may execute at a web application machine 131A, 131B. Although two users 102A, 102N and user computing devices 104A, 104N are shown, the tenant 101 may include any suitable number of users and/or user computing devices. The user computing devices 104A, 104N may be or include any suitable type of computing devices including, for example, laptop computers, desktop computers, tablet computers, mobile computing devices, etc.

In some examples, when a user 102A, 102N requests a query, a front-end query processor 106A, 106N executing at the user's computing device 104A, 104N generates a query message including the query and sends the query message to the web application machine 131A, 131B. In some examples, the front-end query processors 106A, 106N are or include a script or other interpreted language instructions executed through a web browser executing at the user computing device 104A, 104N.

In some examples, the front-end query processor 106A, 106N determines type of the requested query and directs the query message to a port (e.g., a TCP port) of the web application machine 131A, 131B that corresponds to the query type. For example, query messages including queries of a first type may be directed to the web application machine 131A, 131B at a first port, query messages including queries of a second type may be directed to the web application machine 131A, 131B at a second port, and so on. As a part of sending the query message, the user computing device 104A, 104N may break the query message 111 into query message packets. The query message packets may include various metadata describing the query message, including the port to which it is directed.

The query message is directed to a web application machine. FIG. 1 shows two web application machines 131A, 131B demonstrating different example implementations. For example, web application machine 131A includes a data center computing system 128A that executes the web application 132. Web application machine 131B includes a data center computing system 128B that hosts a virtual machine 130 where the virtual machine 130 executes the web application 132. Data center computing devices 128A, 128B may be or include servers or other suitable computing devices. Data center computing devices 128A, 128B may be positioned at a single geographic location or across multiple geographic locations.

Upon receiving the query message, the web application 132 executes the included query and, in some examples, sends a reply message to the user 102A, 102N including results of the query. Executing the query may include performing any suitable type of processing. For example, queries to an ERP web application may include, for example, database queries regarding stored purchase orders, inventory levels, customer records, accounts receivable, etc.

Between the user 102A, 102N and the web application 132, the query message may be communicated by several networks. A tenant LAN may be implemented by the tenant 101. For example, where the tenant 101 is an organization, such as a business, the tenant LAN may be or include an internal network of the organization. A WAN may include the Internet. In some examples, the WAN also includes network components implemented by an Internet Service Provider ("ISP") or other intermediate connection between the tenant LAN and the Internet. A query messages may pass through the WAN to a data center LAN 126 implemented at a data center hosting the web application 132.

The various networks may include various interconnected network appliances. A network controller 124 may configure the network appliances of the network 126 to direct and prioritize the packets making up queries, for example, based on current conditions.

In some examples, the network controller 124 utilize information about user queries that is generated by a tenant backend query processor. The tenant backend query processor may execute at a tenant computing system, which may include any suitable server or other computing device.

In some examples, a WAN controller sends a multi-tenant user query table to the data center controller 124. The multi-tenant user query table may include a list of users, such as users 102A, 102N, and of the different types of queries that that the users are permitted to make. An example of the multi-tenant user query table is provided in TABLE 1 below:

TABLE 1

Example Multi-tenant user query table

| User ID | L1 Query | L2 Query | L3 Query | Tenant Public IP | User Public IP |
|---------|----------|----------|----------|------------------|----------------|

TABLE 1 shows example columns that a multi-tenant user query table may have. Rows of the multi-tenant user query table, also called records, may include fields, with one field for each column. For example, the User ID field of a record may include an indicator of the corresponding user 102A, 102N. The L1 Query, L2 Query, L3 Query fields may include identifiers of different types of queries that the user 102A, 102N is permitted to make. In the example of TABLE 1, three types of queries are classified, L1 queries, L2 queries, and L3 queries. In this example, L1 queries have the highest computational weight, L2 queries have the next highest computational weight, and L3 queries have the lowest computational weight. In various examples, however, different numbers and arrangements of query types may be used.

A multi-tenant user query table record in the example of TABLE 1 may also include a tenant public IP field that indicates an address of the tenant 101 with which the user 102A, 102N is associated. For example, the tenant public IP field may indicate an Internet Protocol ("IP") or other suitable network address of an edge network appliance of a tenant LAN. The user public IP field may include an IP or other suitable network address of the user 102A, 102N. For example, the user public IP field may indicate a network address of the user computing device 104A, 104N to which a reply should be directed. In some examples, some or all of the fields of the multi-tenant user query table may be reflected in the query message packets making up a query message, such as the query message. For example, user ID, tenant public IP and user public IP may be included in packet headers. The type of a query may be reflected in the packet header too, for example, by the TCP port or other port to which the packet is directed. For example, the front-end query processor 106A may direct query messages including L1 queries to a first port, query messages including L2 queries to a second port, and query messages including L3 queries to a third port.

The data center LAN controller 124 may receive the multi-tenant user query table from a WAN controller. The data center LAN controller 124, in some examples, executes at one or more of the data center computing devices 128A, 128B. The data center LAN controller 124 may configure network appliances of the data center LAN to direct query message packets, for example, based on query type, user, tenant, etc. In some examples, the data center LAN controller 124 is also programmed to upgrade and/or downgrade query message packets from a particular user 102A, 102N, for example, depending on the user's activity level (e.g., how many queries the user 102A, 102N has sent within a given time period).

Figure 2:
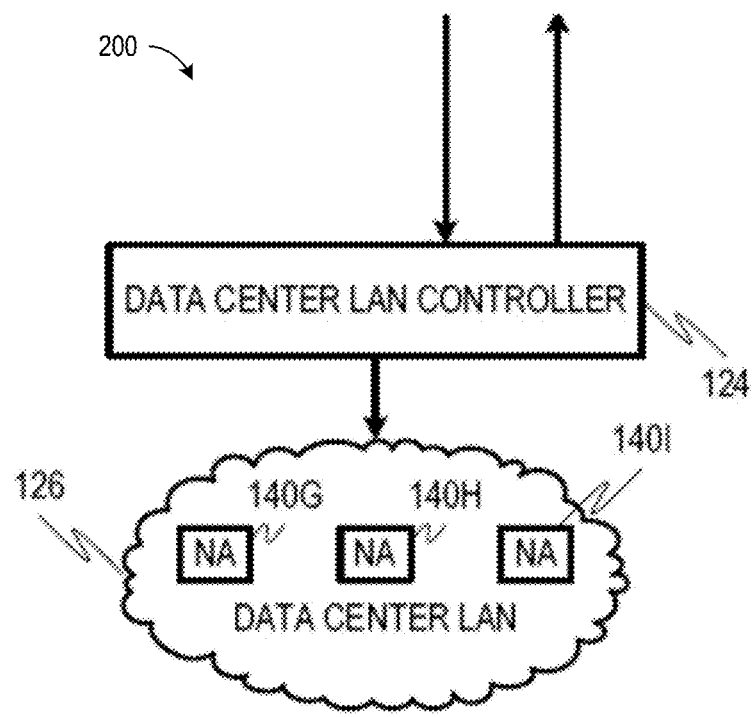
FIG. 2 is a diagram showing another example of the environment of FIG. 1.

FIG. 2 is a diagram showing another example of the environment 100. For example, FIG. 2 shows components for supporting queries from multiple example tenants, including various network appliances 140G, 140H, 140I that are components of the data center LAN network 126, as shown. Although three network appliances 140G, 140H, 140I are shown, in practice the network 126 may include more or fewer than three network appliances. The network appliances 140G, 140H, 140I may be any suitable network hardware for processing packets, such as query packets. For example, some or all of the network appliances 140G, 140H, 140I may be or include switches, routers, hubs, etc.

The network appliances 140G, 140H, 140I may accept flow entries from the respective data center LAN controller 124. A flow entry may include packet identification data and rule data. Packet identification data may identify a packet or type of packet and the rule data may describe how the network appliance 140G, 140H, 140I is to process the packet.

Example packet identification data may include, for example, a user identifier of the sender, an IP or other network address of the sender, a Media Access Control ("MAC") address of the user computing device of the sender, a destination name, a destination IP or other network address, an IP or other address of the host or subnet from which the packet originated, a port number, a queue identifier, etc. In some examples, some or all of the packet identification data may be written to a header of the packet such that the network appliance 140G, 140H, 140I may determine whether any particular packet meets the packet identification data by comparing the packet identification data to the packet header.

Rule data may describe an action or actions that a network appliance 140G, 140H, 140I is to take with respect to a packet identified by packet identification data. Example actions include, sending the packet to another specified network appliance 140G, 140H, 140I, sending the packet to the data center LAN controller 124, adding the packet to a particular queue, queueing the packet, etc.

For example, a flow entry to a network appliance 140G, 140H, 140I may specify that all query packets from a particular user 102A, 102N to a particular port are to be assigned to a particular queue. Another flow entry to a network appliance 140G, 140H, 140I may specify that all query packets assigned to a particular queue are to be routed to a specified other network appliance 140G, 140H, 140I. In some examples, flow entries for the network appliances 140G, 140H, 140I are configured according to a Software Defined Network ("SDN") protocol, such as OpenFlow protocol maintained by the OpenFlow Foundation.

Figure 3:
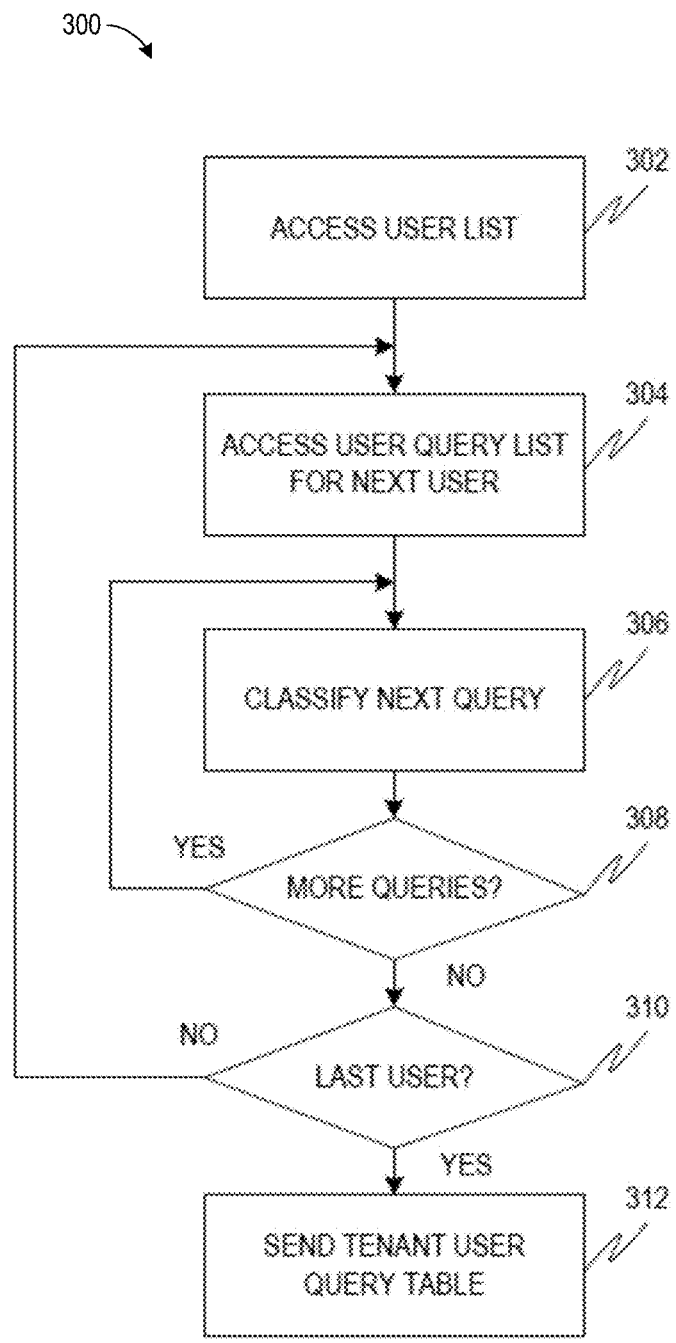
FIG. 3 is flowchart showing one example of a process flow that may be executed by a tenant backend query processor, such as one of the tenant backend query processors to classify the queries that different users are permitted to request.

FIG. 3 is flowchart showing one example of a process flow 300 that may be executed by a tenant backend query processor to classify queries that different users are permitted to request. The process flow 300 is described with respect to a tenant backend query processor for tenant 101, although the process flow 300 may be executed with respect to any of the tenant backend query processors at any of the tenants. In some examples, a tenant backend query processor may execute the process flow 300 periodically. For example, users may change with time and the queries permitted to certain users may also change with time.

At operation 302, a tenant backend query processor may access a user list. The user list may indicate the users associated with the tenant 101 who are permitted to make queries. The user list, in some examples, may also indicate one or more queries that each user is permitted to make. In the example of FIG. 1, then, the backend query processor accesses a user list that indicates the user 102A and the queries that the user 102A is permitted to make. The user list may also indicate the user 102N and the queries that the user 102N is permitted to make. In some examples, the user list is received from an identity management system.

At operation 304, the tenant backend query processor may retrieve a permitted query list for a current user from the user list. The permitted query list may indicate queries that the current user is permitted to make. The tenant backend query processor may retrieve the permitted query list from the user list, from an identity management system or from any other suitable system. At operation 306, the tenant backend query processor may classify the next query on the permitted query list. Classifying the query may include assigning the query to one of a set of query types, for example, based on computational weight. In different examples, the tenant backend query processor may classify queries into any suitable number of types, such as two types, three types, etc. As queries are classified, the tenant backend query processor may generate a tenant user query table, for example, similar to TABLE 1 above but including records for users considered by the backend query processor.

At operation 308, the tenant backend query processor may determine if there are any queries from the permitted query list accessed at operation 304 that have yet to be classified. If yes, the tenant backend query processor may return to operation 306 and classify the next query for the considered user. If no permitted queries for the user remain (e.g., if all permitted queries for the user have already been classified), then the tenant backend query processor may, at operation 310, determine if the current user is the last user from the user list accessed at operation 302. If not, the tenant backend query processor may return to operation 304 and access a permitted query list for the next user from the user list. If the current user is the last user, the tenant backend query processor may, at operation 312, send the tenant user query table, for example, to a WAN controller. The tenant backend query processor 112 may generate multi-tenant user query table update data at operation 312.

Cloud service providers make substantial investments to set up a data center backbone network and attempt to achieve maxim network resource utilization when responding to user queries. Note, however, that the actual utilization of a network is not easy to predict or control. With the introduction of OpenFlow and SDN, the network control layer now has the capability to talk with applications and/or services that the service provider offers to customers. A Software Defined Data ("SDD") center suggests resource virtualization at compute, storage and network layer. Some embodiments describe herein aim to maximize network resources with respect to multi-tenancy at network layer. Moreover, with network multitenancy, different customers traffic flows may be prioritized. Network resources may then be allocated to traffic flows dynamically based on priority. Some embodiments are associated with ERP solutions deployed in a cloud environment and offered to customers as a Software as a Service ("SaaS"). Embodiments may prioritize the ERP traffic flows using a regression technique based on the response time for the execution of a query caused by a traffic flow in the ERP backend server. Moreover, some embodiments may be associated with multiple queues in network devices and a flow-to-queue assignment may be performed based on the traffic flow priority and demand and supply scores. Some embodiments may provide, for example, more than a 10% increase in service provider utility as compared to standard data center single queue operations.

A SDN may control and manage an underlying network via a physically distributed (but logically centralized) set of controllers to help meet Service Level Agreements ("SLAs") required by cloud service providers. This SDN approach has recently flourished and is becoming the most useful network architecture for various work environments and real-time problems.

In many cases, link utilization of the backbone network may be very low. Also, every data center customer traffic flow may be given equal priority and allotted the same network resources. With an SDN, however, link utilization may be substantially higher, even over 90%. Further, a Software Defined Data Centers ("SDDC") may have a single controller virtualizing compute, network, and/or storage resources. Therefore, some embodiments may SDDC principles to design a network control application that exchanges information with virtual machines and provides network based multi-tenancy to improve network resource allocations to different customers traffic flows (e.g., to improve link and flow utilizations).

Embodiments may be associated with network multi-tenancy so as to improve network device resource utilization with respect to optimal (or near optimal) resource allocation to traffic flows. Embodiments may create a network based multi-tenancy architecture for ERP traffic flows. Traditionally, an ERP was used to manage end-to-end business transactions for an organization. Moreover, the ERP architecture may be deployed on standalone systems on premise. With invent of cloud services, however, the ERP may instead be deployed on virtual machines running on data centers (and offered to customers in the form of a SaaS). Note that a current ERP is expected to be rich in computational resources for execution of complex and data intensive ERP queries.

Some embodiments described herein may score ERP queries based on execution response time and bandwidth demand and supply. Moreover, the response time execution score may be assigned using a regression fit module. Some embodiments may also create a network multi-tenancy architecture using queues on network device egress and ingress ports. Embodiments may also create a scheduling application for optimal assignment of ERP traffic flow to respective queues (e.g., to improve link and flow utilizations). The scheduling application may use, in some embodiments, bandwidth demand and supply parameters for optimal scheduling.

Traffic engineering may be based on theoretical and empirical aspects of real networks and metrics may include, for example, resource utilization, throughput, and network fairness. An optimal routing scheme under several objectives to match traffic engineering goal may be desired and a designer may compare maximal and mean link utilization, latency metrics and residual bandwidth. Similarly, a designer might compute metrics to evaluate effects of traffic engineering on application level performance. Note that link utilization might not be a good metric in this regard. In some cases, a flow utilization view may be used for different utility parameters to enhance application performance. Similarly, designers may use change peers, links, and services to improve traffic engineering. Good metrics may provide meaningful information regarding the state of a network with respect to traffic engineering performance.

A system model of some embodiments of the present invention will now be provided. Let the data center network be represented by a graph $\mathcal{G}$, such that $\mathcal{G}=\{v,e,w\}$. Here $v=\{v_1, v_2, v_3, \ldots v_n\}$, where n is the number of network devices. The network devices are interconnected through full duplex links represented by edges $e=\{e_1, e_2, e_3, \ldots, e_k\}$. The bandwidth of the links or edges are represented by $w=\{w_1, w_2, w_3, \ldots, w_k\}$ be the bandwidth of the links or edges $e_k$.

Let C be the set containing customers which access ERP services through the same data center network $\mathcal{G}$ such that $C=\{c_1, c_2, c_3, \ldots, c_m\}$. There is another set C* containing premium customer such that $C^* \subseteq C$. Each customer may use a set of Internet of Things ("IoT") devices to send data tot ERP using web-services. According to some embodiments, these two sets of customers may be referred to as a premium customer and a non-premium customer.

Each OpenFlow device or switch in $\mathcal{G}$ has a set of active physical ports (including egress and ingress buffers), where the ports are configured with $Q=\{q_1, q_2, q_3, \ldots, q_p\}$. Each queue is characterized by maximum data rate $R=\{r_1, r_2, r_3, \ldots, r_p\}$. Further, these queues are also marked by maximum number of packets which can be accumulated in buffer without any loss, represented by $D_{max}=\{d_1, d_2, d_3, \ldots, d_p\}$.

ERP software in a cloud environment may offer a complete end-to-end business solution in form of SaaS, and the complete ERP suite may be installed on a virtual machine. The suite may have modules for front-end and the business logic compiled using Business Object Processing Framework ("BOPF"). The cloud based ERP system may be very different as compared to a traditional on-premise ERP system. For example, the cloud based ERP solution may also have end-to-end integration solutions (where the ERP suite talks to other ERP suites to maintain data consistency in substantially real-time).

When a transaction is executed by a user via a User Interface ("UI"), the user interaction steps may be translated by the service framework into relevant core service operations, such as Query, Retrieve, Create, Update, and/or Delete. The BOPF framework may delegate these operations to dedicated methods of the corresponding service provider interfaces. Some frameworks may use a Fast Search Interface ("FSI") which has secondary persistent storage of the data being requested. This secondary persistence may be, for example, a database that resides or runs on another virtual machine (or may even be a standalone system).

Figure 4:
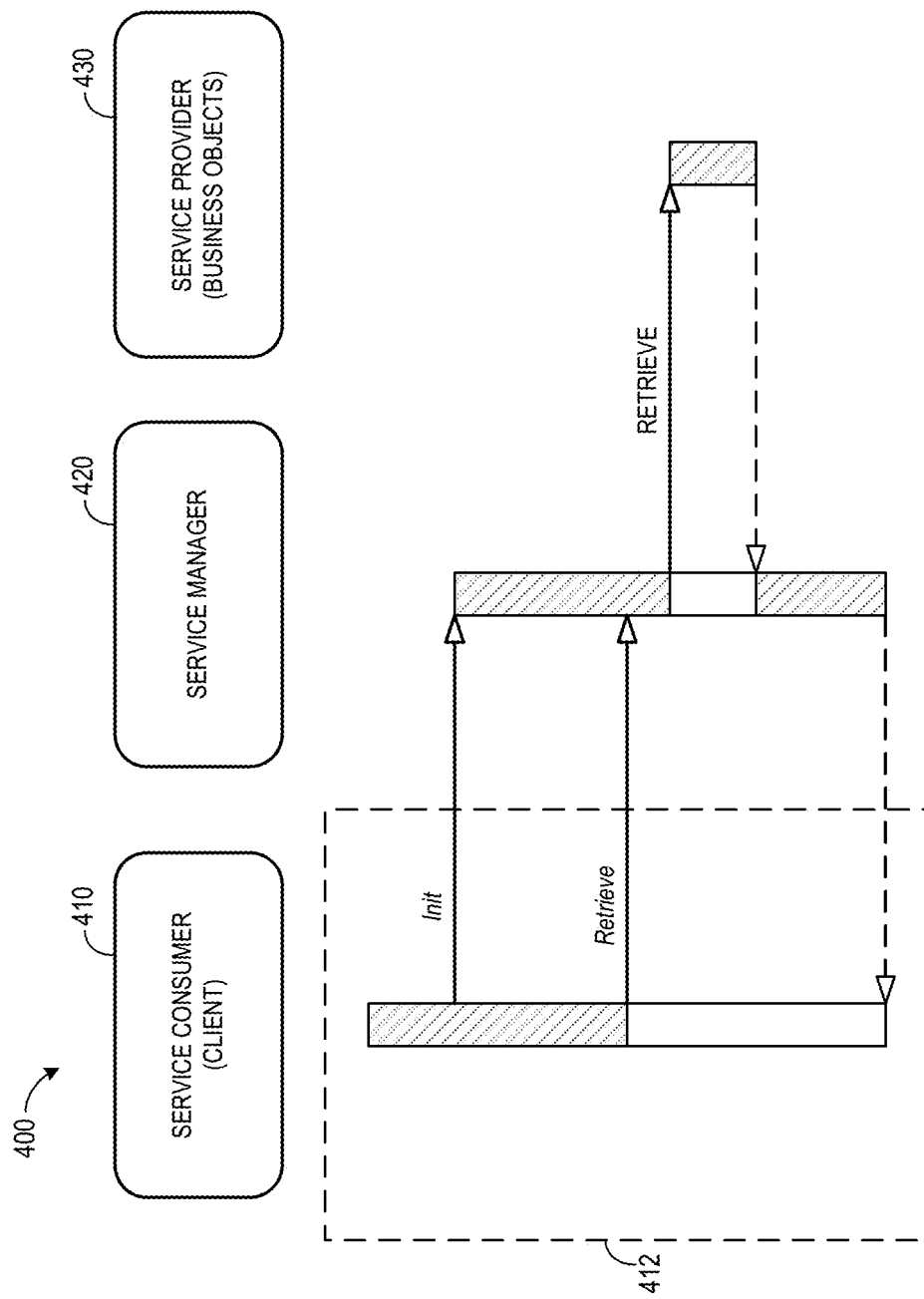
FIG. 4 is a sequence diagram of a user request from a UI to a backend layer.
Figure 5:
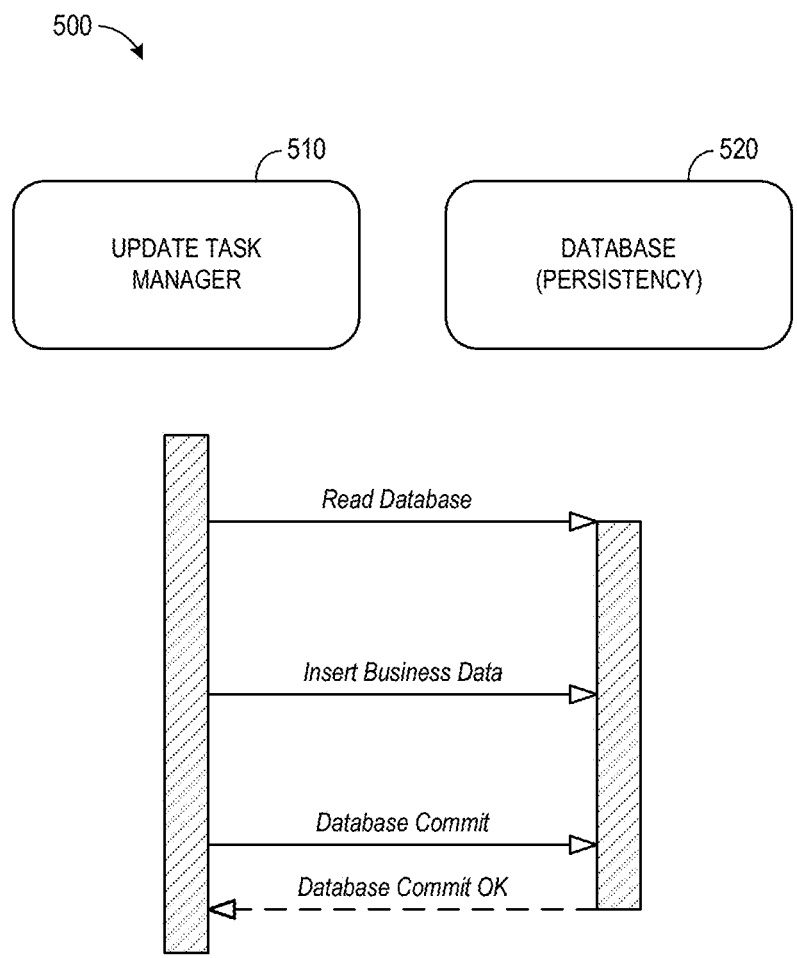
FIG. 5 is a sequence diagram of a backend layer request to a database layer.

As illustrated in FIG. 4, a system 400 may include a service consumer 410, a service manager 420, and a service provider 430. The sequence diagram in FIG. 4 represents the sequence of steps that may be performed after a user hits a button on the UI screen. The action button is responsible for fetching data from the ERP. This request is initially received from the client (service consumer 410) by the service manager 420 layer which forwards the request to a BOPF layer (service provider 430 or business object) which has the actual business logic. Later on, based on the business logic, the request is forwarded to a database layer 520 (from a backend virtual machine to a database system) from an update task manager layer 510 (which may also be a part of the BOPF layer) as shown in FIG. 5. At the end, every user action fired from the UI is converted to a query. This action usually generates a sequence of 8 to 16 packets from the user system which must initially reach the backend server.

Thus, the customers may generate and fire multiple traffic flows to ERP services running on data center virtual machines. In an abstract form, the flows are generated when the user accesses ERP queries, such as when viewing a Purchase Order, Sales Order, Posting of Supplier or Customer Invoice, etc. Once these flows are fired from the end users, each flow might contain, for example, an average of 8 to 16 packets. Note, however, that there may also be ERP queries where the number of packets in the flow is not very high and cannot be predicted beforehand. Each flow may be assigned a calibrated number based on its computational intensiveness or the execution response time by executing the respective query for which the flow was fired. In some embodiments, the system may score the queries using a response time in milliseconds (ms) attribute. For example, the details of the attributes used for scoring might include:

Response Time (ms)—This time may includes wait for work process time, processing time (ABAP), generation time, load times, roll times for rolling in work data, database time, enqueue time for logical locks, roll wait time (not including task types RFC/CPIC/ALE). When a database procedure is used between application server and liveCache, a new component such as "DB procedure" might also be added to the response time.

Time in WPs (ms)—This attribute may represent a difference between the response time and a queue time. Here queue time may represent a wait time for the dispatcher wait queue.

Wait Time (ms)—Time which the transaction (query) step is put in the queue due to shortage of work process to the time when a free work process is available to execute the transaction step.

CPU Time (ms)—This attribute is not a separate time component but a sum of CPU wait times of each corresponding operation listed in the response time (e.g., ABAP processing, program/screen load and generation, roll-in and enqueue operation (except database operation), etc.).

DB Req. Time (ms)—Time used by database to execute needed database operations like reading table changing existing table data or inserting new data into table.

Virtual Machine Elapsed Time (ms)—A transaction within a user session can be carried out in several dialog steps. At the end of each dialog step, a kernel may write a statistic record with its associated subrecords to the buffer. This information may then be passed through an explicit buffer flush to the file either automatically once an hour, or as and when required. If a Virtual Machine Container ("VMC") has been used in a dialog step, this is indicated by Virtual Machine Elapsed Time (ms).

Memory Used (kb)—Total amount of main memory used in the backend server for execution of a query or ABAP statements and transactions.

Transferred kBytes—Amount of data transmitted to the memory for processing of the query of ABAP statements.

Figure 6:
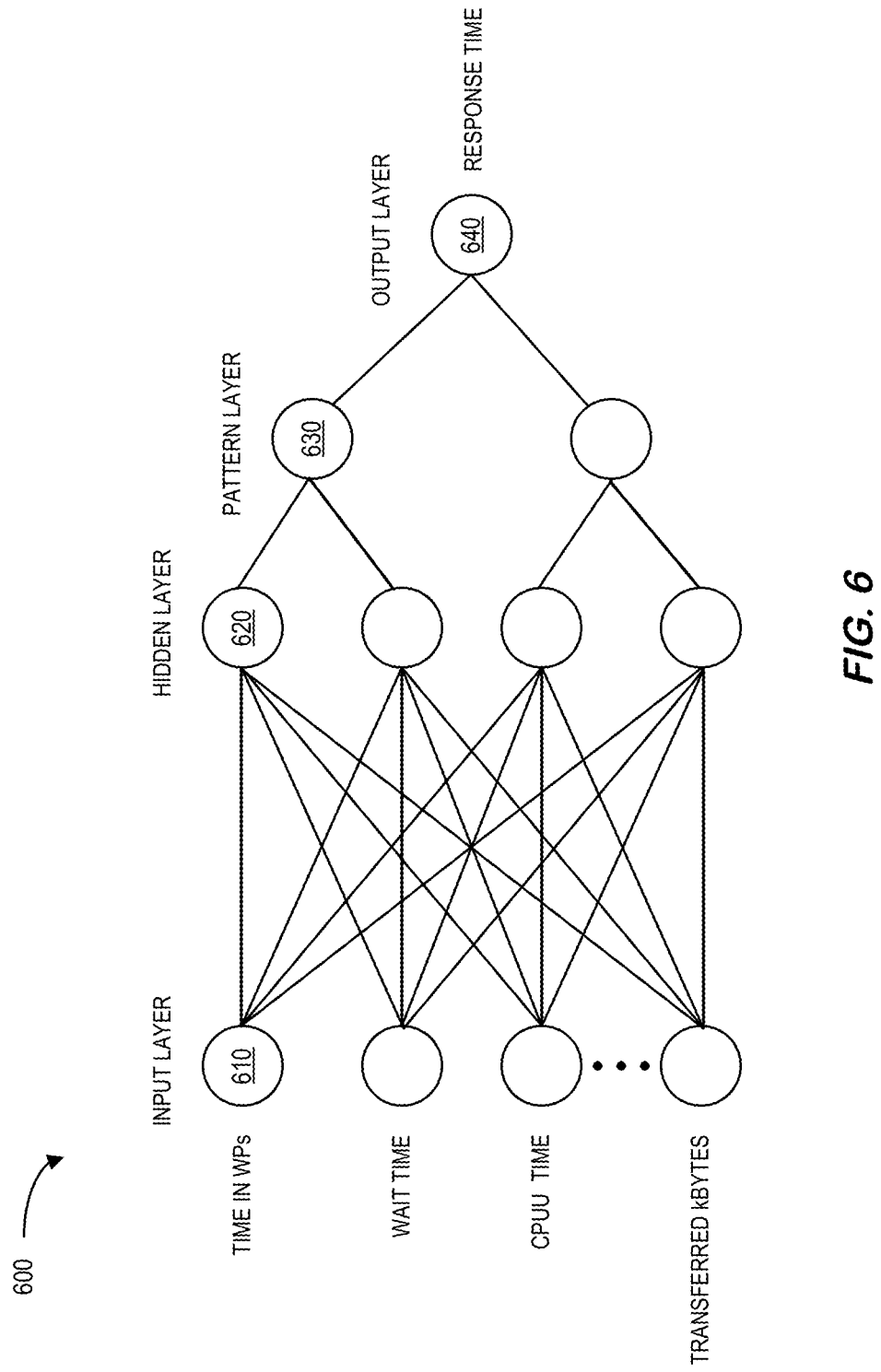
FIG. 6 is an architecture of a general regression neural network.

In an ABAP backend system, some or all of the above attributes may be obtained for any query execution. FIG. 7 shows a table 700 including sample values including a query identifier 702, a response time 704, a wait time 706, a CPU time 708, memory used 710, and transferred kBytes 712. According to some embodiments, there may be a batch job responsible for calculating all the above attributes. However, the calculation of the Response Time (ms) attribute may be the most computational expensive operation and creates additional overhead on the ABAP backend system. Therefore, embodiments may use other attributes to approximate the response time for queries. For example, a General Regression Neural Network (GRNN) is a probabilistic neural network used for performance comparison and prediction. A system 600 may include an input layer 610, a hidden layer 620, a pattern layer 630, and an output layer 640 (providing the response time) as shown in FIG. 6. In the GRNN, the pattern layer 630 may be used to perform summation of numerator neurons and denominator neurons. The values of the hidden neurons 620 may be added by the denominator summation part and the values from the multiplication of the weights of the actual values of the hidden neurons may be added by the numerator summation part. The output will be the division of the values from these two parts. Some embodiments described herein use a GRNN 600 because it has been affirmed as very effective method for prediction and modeling. Also, the GRNN 600 has real-time forecasting capabilities due to less training time and faster convergence.

In an overall abstract, a background job may run in the ABAP backend system which calculates all attributes except response time for a given query. Then, the system inputs 610 this data to the GRNN 600 and gets the response time 640 in real time with very low CPU overhead. Then, based on the response time, the system may calculate the value of a for a given flow F.

Note that a customer C has access to a wide range of ERP queries. Therefore, each traffic flow ($F=\{f_1, f_2, f_3, \ldots, f_q\}$) is mapped to a ERP query. For a customer, based on the maximum and minimum values of the response time for all queries, a traffic flow F is assigned a score $\alpha$ ($\alpha=\{\alpha_1, \alpha_2, \alpha_3, \ldots, \alpha_q\}$) such that the score is between 0 and 10.

One goal of some embodiments is to maximize network bandwidth utilizations with respect to the scores of traffic flows and also type of customer (i.e. premium or non-premium customers). The network multi-tenancy may seek to maximize network resource utilization with respect to traffic prioritization of customer traffic.

It may not be easy for a controller to identify traffic flow against each query. Hence, the front-end may fire each query on a specific TCP port based on its score. In some embodiments, as we have scored the flows on a scale of 0 to 10, we create 10 TCP ports to identify each flow. For example, if a flow is scored 4.33 it may be mapped to a fourth available TCP port. OpenFlow devices installed in the user site and data center may have already installed the flow entries with all specific TCP ports. For instance, in an office there may be many users who access ERP services with URL xxx.com. Now, the system has 10 TCP ports available to identify the flows. The network controller may add all 10 flow entries in the flow table from every user on the user site OpenFlow devices. Similarly, the controller may add all the 10 flow entries in the flow table of OpenFlow devices in the data center per customers global IP address. The data center OpenFlow devices may have 10 flow entries per global IP address of customer. Now, for these 10 flow entries the queue assignment may be done such that it leads to maximum network resource utilization. Typically, one flow entry on the data center OpenFlow devices is responsible for receiving ERP traffic flows from multiple users (as a group of users in an office location may have one public IP address and Network Address Translation ("NAT") goes on at the gateway device with the Private IP addresses). Further, in an ERP OpenFlow table, there may be 10 flow entries created with a source IP address as the public IP address and destination IP address as the ERP's global IP address.

Hence, to solve the proposed problem, embodiments may model maximization of network bandwidth utilization.

$$\text{Maximize } u(r) = \frac{\sum_{i=1}^{q} r_i \cdot f_k}{w_k}$$

subject to constraints:

$$\sum_{i=1}^{q} r_i \cdot f_k \leq w_k$$

$$w_k > 0$$

This optimization problem depends upon the rate r assigned to a traffic flow for a query. The rate r depends upon the queue assigned to the flow entry. Hence, the overall optimization problem becomes the optimal assignment of queue to the traffic flow. This optimization is for every path or edge in the data center network $\mathcal{G}$. In the above equation, the value of $f_k$ is 1 if the traffic flow passes through that path (else the value is 0).

Before calculating demand-supply scores of all the queries for a customer, the may determine a load fraction for a query. The load fraction may be defined as follows:

$$L(\alpha_i) = \frac{\alpha_i}{\sum_{k=1}^{|\beta|} \alpha_k}$$

Here $|\beta|$ represents the total distinct query set for the all current active users for a given customer C. As a whole, $L(\alpha_i)$ finds out the load fraction of a query with score $\alpha_i$ with respect to all other queries. Now the demand supply score for a nonpremium customer (C–C*) is given as follows:

$$DS_1 = L(\alpha_i) + \tan^{-1}\{e^\lambda - \gamma\}$$

Where $\lambda$ is the difference between demand and supply (note that $\lambda$ is defined below). The function $\tan^{-1}\{e^\lambda - \gamma\}$ may always give a value between 1.5 and 0.7 based on the difference between demand and supply or $\lambda$. Here, $\gamma$ is a pre-determined constant used to scale the scores.

$$\lambda = \left\{\frac{\alpha_i}{10} * p\right\} - \left\{w_k - \sum_{i=1}^{q} r_i \cdot f_k\right\}$$

Where p is the total number of queues configured in the system. Further, to calculate the demand-supply scores for the queries of premium customers (C*) or "high priority" customers (as compared to non-premium), embodiments may use the following nonlinear equation:

$$DS_2 = DS_1 + a \cdot \left\{\frac{\alpha_i}{10} * p\right\} + b \cdot \left\{\frac{\alpha_i}{10} * p\right\} + c$$

The $DS_2$ score increases non-linearly based on the demand. Note that the values of a, b, and c may be chosen at run-time to scale the values of the query scores.

For scheduling of the ERP traffic flows to queues, embodiments may use two different types of information: (i) the sum of all query scores for a traffic flow entry (each traffic flow is assigned a TCP port and the query to TCP port mapping table can be used to obtain all queries for a given traffic flow); and (ii) an estimate of total packets. The ERP backend server may be responsible for calculating the scores of the queries. Algorithm 1 may be responsible for calculating Demand-Supply (DS) scores of queries and estimating the packets:

| Algorithm 1: DS score calculation | |
|---|---|
| Inputs : | Bandwidth Utilization of Queue - $w_k$ |
| | Query List $Q_i$ and its bandwidth demand $T_i$ |
| | Flow Entry list f∀ $\mathcal{F}$ |
| Outputs: | DS score Sum for a given flow f∀ $\mathcal{F}$ |
| | Total Packet Count req. for a given flow f |
| 1    Q = NULL; | |
| 2    Query_Sum = NULL; | |

-continued

Algorithm 1: DS score calculation

```
3    Packet_Sum = NULL;
4    for ∀f ∈ F do
5    |    Q_f = get_most_recent_queries( );
6    |    Query_Sum = 0;
7    |    for ∀q ∈ Q_f do
8    |    |_   Query_Sum_f+ = DS(q, w_k[f]);
9    |_   Packet_Sum_f = q · 16;
10   return Query_Sum, Packet_Sum;
```

Algorithm 1 iterates through all traffic flow entries installed on OpenFlow devices in data center and calculates the query sum and packet sum. This algorithm is executed by the backend server. In step 5, the backend server gets all the active users for a query f and later gets 40% of most recently transacted queries for all active users. This is because for an active user the system cannot take all the used queries in to account in a given time slot. Later on, in step 9, to get the packets the system multiplies 16 with total number of queries. This is because in ERP traffic each traffic flow is usually associated with an average number of packets from 8 to 16. Now, using the query DS sum and packets, the proposed Algorithm 2 selects a queue for a traffic flow. In step 8 the DS scores are calculated where $w_k[f]$ returns the bandwidth utilization of queue to which already f is assigned.

Algorithm 2: Queue Selection

```
     Inputs   :    Query_Sum
                   Packet_Sum
                   Flow Entry Set F
                   All Configured Queues Q
     Outputs:      Selected Queue Set C[| F |][| Q |]
1    for ∀q ∈ Q do
2    |    for i = 0 to F do
3    |    |    for w=0 to q[d] do
4    |    |    |    if i == 0||w == 0 then
5    |    |    |    |    C[i][w] = 0;
6    |    |    |    else if Packet_Sum[i – 1] ≤ w then
7    |    |    |    |    C[i][w] = max
     |    |    |    |    (Query_Sum[i – 1] + C[i – 1][w –
     |    |    |    |    Packet_Sum[i – 1]],C[i –1][w]);
8    |    |    |    else
9    |    |    |_   |    C[i][w] = C[i–1][w];
     |    |_
     |_
10   return C;
```

Algorithm 2 uses Queue max data rate r, the DS scores and Packet_Sum to do the queue selection for a given flow. This selection is done in a dynamic programming approach using the Query_Sum and Packet_Sum values.

The overall flow of according to some embodiments includes the following three steps:

Step 1—The backend server periodically monitors the behavior of every queries on the ERP. For this, the backend server runs the trained GRNN and calculates the response time. Based on the response time, a score is assigned to the query. Based on the scores the backend server changes the entries in Query to Port mapping table. Now the front-end sees the table and fires all the queries to the TCP port as mentioned in the mapping table.

Step 2—The backend server also periodically triggers the queue monitoring modules on controller. The queue monitoring module (running on controller) is responsible for calculating the current bandwidth utilization of the queue and passes this information to backend server. The backend server further calculates the demand-supply scores for the most recently used queries based on the queue bandwidth utilization using Algorithm 1.

Step 3—Further, based on the new calculated demand-supply scores of all of the queries, and Algorithm 2 assigns a queue to the flow entries.

According to some embodiments, an OpenFlow ("OF") controller may be connected to a network consisting of OF enabled switches to create an SDN network. To simulate such a scenario, a total of 32 hosts may be connected to switches and five servers may be responsible to receive their requests. A time slot of 30 seconds may be used after which the backend server triggers the queue monitoring modules and initiates the queue selection modules. This triggering also calculates the DS scores for flow entries based on most frequently used queries by the active users. A total of six queues may be configured on each egress and ingress ports of the switches. These queues may have, for example, 16.66 Mbps, 33.32 Mbps, 49.98 Mbps, 66.64 Mbps, 83.30 Mbps and 100 Mbps maximum data transmission rates. Further, a total of 40 customers may be simulated with each customer having 700-900 queries. The end user fired traffic flows for around 50 minutes were monitored for the link utilization, flow utilization, cumulative satisfaction factor, and service provide utility. The multiple queue embodiment can then be compared to standard single queue data center operation.

According to the simulated embodiment, the GRNN has "spread" as only one free parameter. The spread is the distance of an input from a neurons weight. A GRNN was simulated on matlab with spread value of 0.6. This value of spread was selected to give the best regression fit in Mean Squared Error ("MSE") for training and testing.

The cumulative satisfaction factor in case of multiple queue configuration with dynamic flow assignment was always greater than the standard data center single queue operation. The satisfaction factor for a customer is always the ratio of remaining amount of bandwidth and the bandwidth demand. The satisfaction factor may be calculated as follows:

$$S_F(\cdot) = \frac{\lambda}{\text{Demand}}$$

$$= \frac{\left\{\frac{\alpha_i}{10} * p\right\} - \left\{w_k - \sum_{i=1}^{q} r_i \cdot f_k\right\}}{\left\{\frac{\alpha_i}{10} * p\right\}}$$

$$= 1 - \frac{\left\{w_k - \sum_{i=1}^{q} r_i \cdot f_k\right\}}{\left\{\frac{\alpha_i}{10} * p\right\}}$$

The average data center or service provider utility may also be improved by embodiments described herein. The utility may be calculated as follows:

$$\text{Utility} = 100 - \frac{\text{LinkUtilization} - \text{Flow\_Utilization}}{\text{LinkUtilization}} * 100$$

Figure 8:
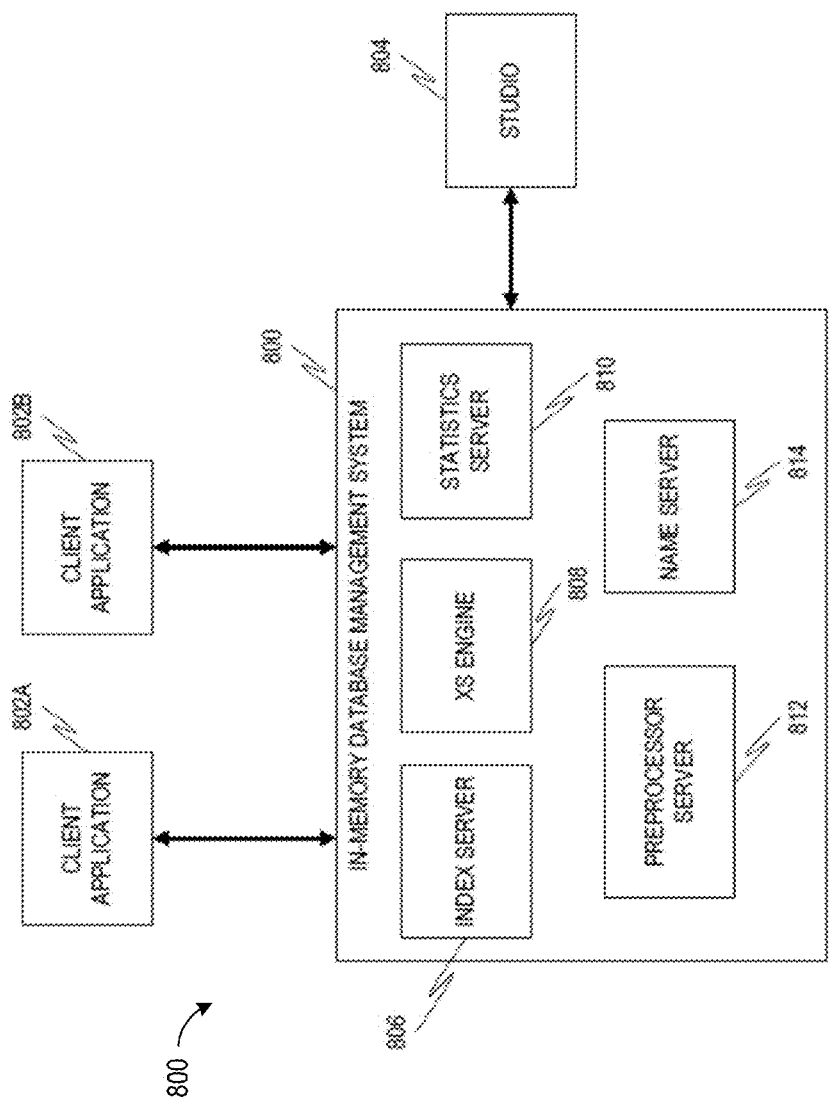
FIG. 8 is a diagram illustrating an example of an in-memory database management system 800 that may be used to implement a web application in some examples of the network virtualization systems and methods described herein.

FIG. 8 is a diagram illustrating an example of an in-memory database management system 800 that may be used to implement a web application in some examples of the network virtualization systems and methods described herein. An in-memory database stores data primarily at main memory, such as a Random Access Memory ("RAM"). This is different than databases that primarily employ a disk storage mechanism. In some examples, the database management system 800 may be or include an example of the HANA system from SAP SE of Waldorf, Germany. Although various features of web applications are described herein in the context of an in-memory database, network virtualization for web application queries may be generally performed for any type of web application using any suitable type of database.

The in-memory database management system 800 may be coupled to one or more client applications 802A, 802B. For example, client applications 802A, 802B may be examples of the web application 132 described herein. Client applications 802A, 802B may execute one or more queries utilizing data from the database including, for example, presenting a user interface (UI) to one or more users, entering data, accessing data, etc. The client applications 802A, 802B may communicate with the in-memory database management system 800 through a number of different protocols, including Structured Query Language ("SQL"), Multidimensional Expressions ("MDX"), Hypertext Transfer Protocol ("HTTP"), Representational State Transfer ("REST"), Hypertext Markup Language ("HTML"), etc.

FIG. 8 also shows a studio 804 that may be used to perform modeling by accessing the in-memory database management system 800. In some examples, the studio 804 may allow complex analysis to be performed on data drawn not only from real time event data and windows, but also from stored database information.

The in-memory database management system 800 may comprise a number of different components, including an index server 806, an XS engine 808, a statistics server 810, a preprocessor server 812, and a name server 814. These components may operate on a single computing device, or may be spread among multiple computing devices (e.g., separate servers). The index server 806 contains the actual data and the engines for processing the data. It may also coordinate and uses the other servers.

The XS engine 808 allows clients to connect to the in-memory database management system 800 using web protocols, such as HTTP. Although the XS engine 808 is illustrated as a component of the in-memory database management system 800, in some examples, the XS engine may be implemented as one or more Application Program Interfaces (APIs) and/or services positioned between the client applications 802A, 802B and the in-memory database management system 800. For example, the XS engine 808 may be configured to perform the functions of the privilege filter 118 for client requests received in languages other than SQL such as, for example, MDX, HTTP, REST, HTML, etc.

The statistics server 810 collects information about status, performance, and resource consumption from all the other server components. The statistics server 810 can be accessed from the studio 804 to obtain the status of various alert monitors.

The preprocessor server 812 is used for analyzing text data and extracting the information on which the text search capabilities are based.

The name server 814 holds information about the database topology. This is used in a distributed system with instances of the database on different hosts. The name server 814 knows where the components are running and which data is located on which server. In an example embodiment, a separate enqueue server may operate in the manner described above with respect to enqueue servers, specifically with regard to creating and managing light-weight enqueue sessions.

Figure 9:
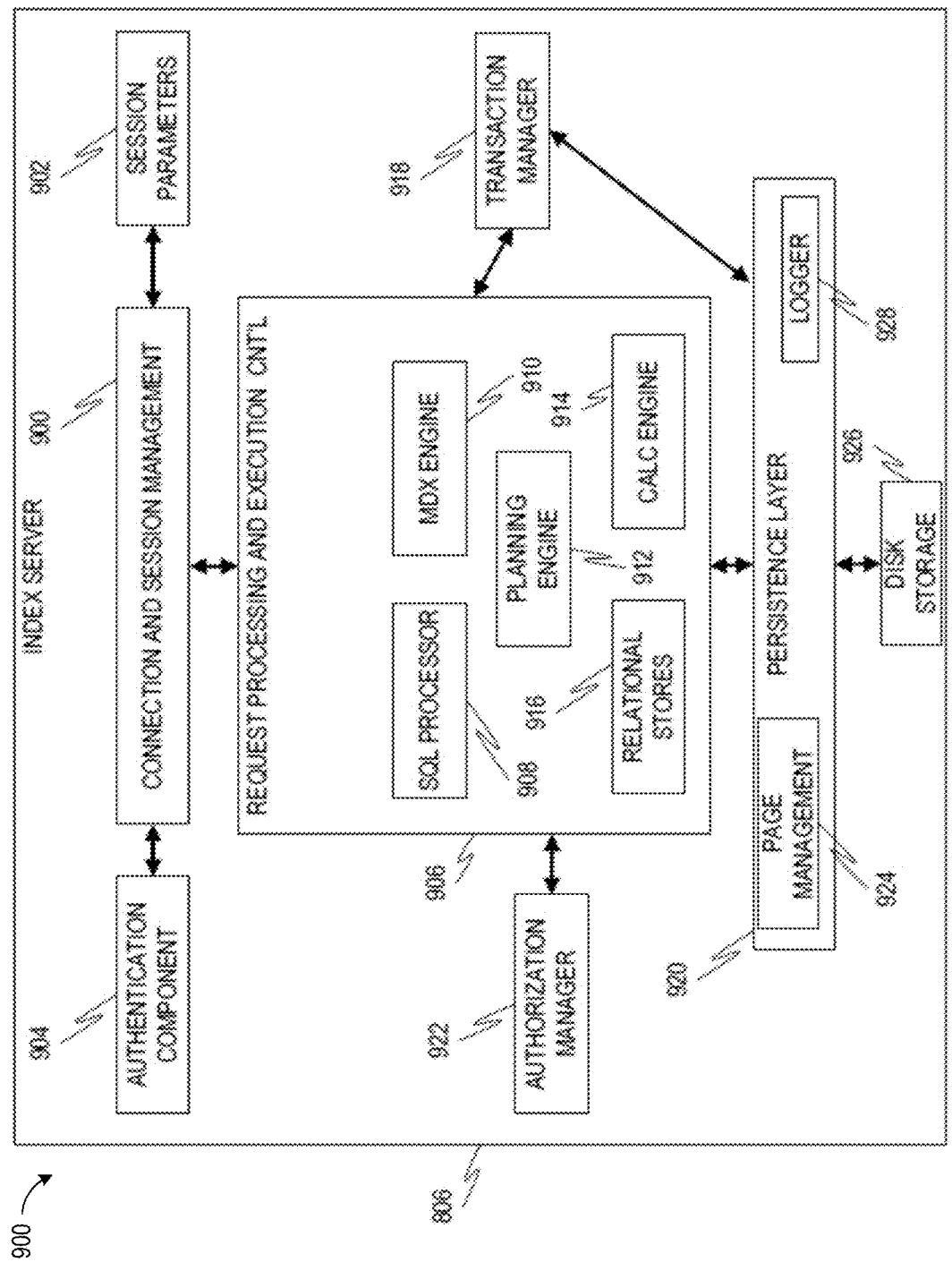
FIG. 9 is a diagram illustrating an example of the index server of FIG. 8.

The index server 806, in some examples, may house an instance of the privilege filter 118. The instance of the privilege filter 118 at the index server 806 may be in addition to or instead of the instance of the privilege filter 118 at the XS engine 808. FIG. 9 is a diagram illustrating an example of the index server 806. Specifically, the index server 806 of FIG. 8 is depicted in more detail. The index server 806 includes a connection and session management component 900, which is responsible for creating and managing sessions and connections for the database clients (e.g. client applications 802A, 802B). Once a session is established, clients can communicate with the database system using SQL statements. For each session, a set of session parameters 902 may be maintained, such as auto-commit, current transaction isolation level, etc. Users (e.g., system administrators, developers) may be authenticated by the database system itself (e.g., by logging in with log-in information such as a user name and password, using an authentication component 904) or authentication can be delegated to an external authentication provider such as a Lightweight Directory Access Protocol ("LDAP") directory.

Client queries can be analyzed and executed by a set of components summarized as request processing and execution control 906. An SQL processor 908 checks the syntax and semantics of the client SQL statements and generates a logical execution plan. MDX is a language for querying and manipulating multidimensional data stored in OLAP cubes. As such, an MDX engine 910 may be provided to allow for the parsing and executing of MDX commands. A planning engine 912 allows applications to execute basic planning operations in the database layer. One such operation is to create a new version of a dataset as a copy of an existing dataset, while applying filters and transformations.

A calculation engine 914 implements the various SQL script and planning operations. The calculation engine 914 creates a logical execution plan for calculation models derived from SQL script, MDX, planning, and domain-specific models. This logical execution plan may include, for example, breaking up a model into operations that can be processed in parallel. The data is stored in relational stores 916, which implement a relational database in main memory. Each SQL statement may be processed in the context of a transaction. New sessions are implicitly assigned to a new transaction. A transaction manager 918 may coordinate database transactions, controls transactional isolation, and keeps track of running and closed transactions. When a transaction is committed or rolled back, the transaction manager 918 informs the involved engines about this event so they can execute needed actions. The transaction manager 918 also cooperates with a persistence layer 920 to achieve atomic and durable transactions.

An authorization manager 922 is invoked by other database system components to check whether the user has the specified privileges to execute the requested operations. The database system allows for the granting of privileges to users or roles. A privilege grants the right to perform a specified operation on a specified object.

The persistence layer 920 ensures that the database is restored to the most recent committed state after a restart and that transactions are either completely executed or completely undone. To achieve this goal in an efficient way, the persistence layer 920 uses a combination of write-ahead logs, shadow paging, and save points. The persistence layer 920 also offers a page management interface 924 for writing and reading data to a separate disk storage 926, and also contains a logger 928 that manages the transaction log. Log entries can be written implicitly by the persistence layer 920 when data is written via the persistence interface or explicitly by using a log interface.

Figure 10:
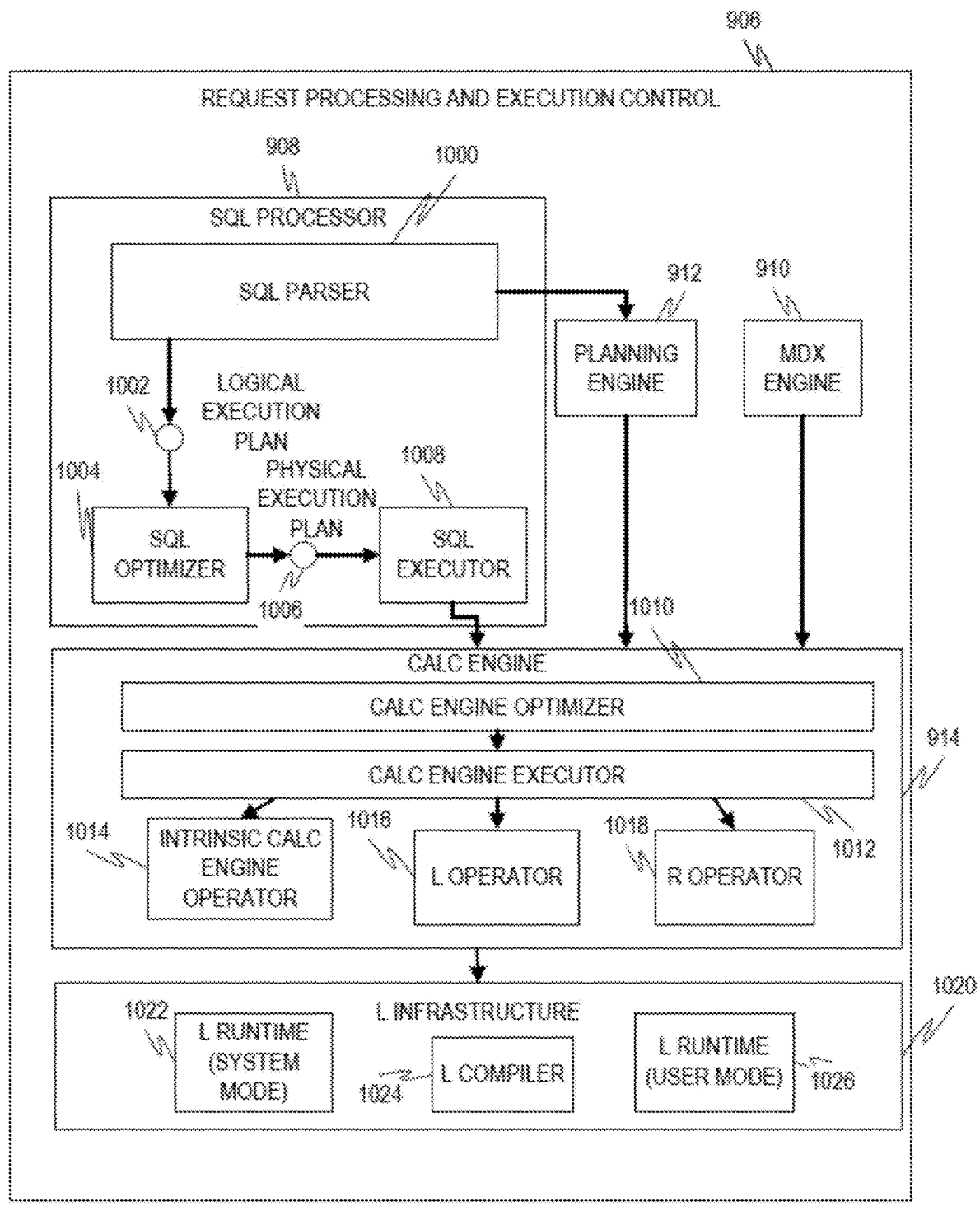
FIG. 10 is a diagram illustrating one example of the request processing and execution control of FIG. 9.

FIG. 10 is a diagram illustrating one example of the request processing and execution control 906. This diagram depicts the request processing and execution control 906 of FIG. 9 in more detail. The SQL processor 908 contains an SQL parser 1000, which parses the SQL statement and generates a logical execution plan 1002, which it passes to an SQL optimizer 1004. The SQL optimizer 1004 optimizes the logical execution plan 1002 and converts it to a physical execution plan 1006, which it then passes to a SQL executor 1008. The calculation engine 914 implements the various SQL script and planning operations, and includes a calc engine optimizer 1010, which optimizes the operations, and a calc engine executor 1012, which executes the operations, as well as an intrinsic calc engine operator 1014, an L operator 1016, and an R operator 1018.

An L infrastructure 1020 includes a number of components to aid in the running of L procedures, including an L-runtime (system mode) 1022, an L compiler 1024, and an L-runtime (User mode) 1026.

Figure 11:
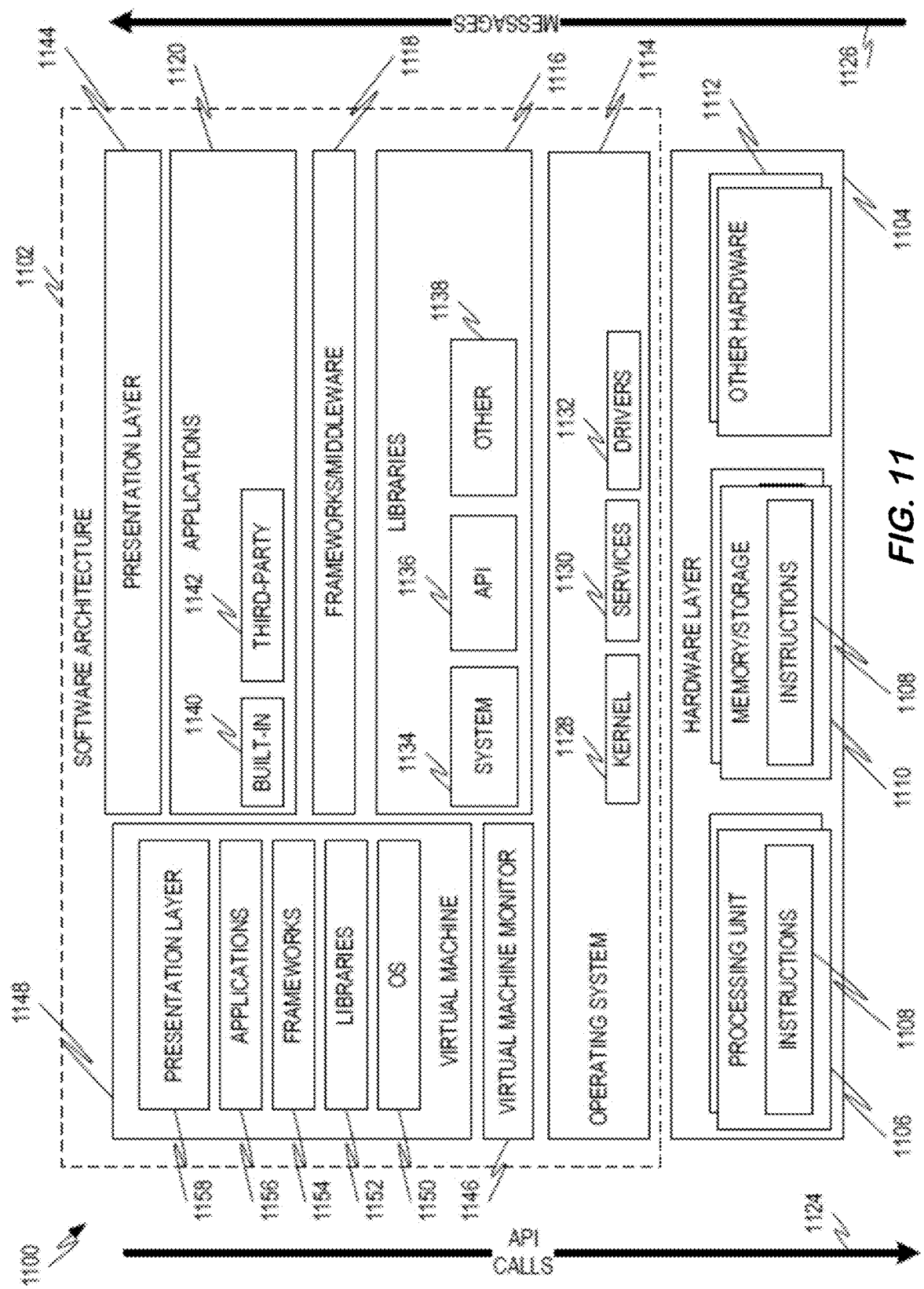
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system 1200 of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of computer system 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the architecture 1102 to pause its current processing and execute an Interrupt Service Routine ("ISR") when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus ("USB") drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules. In some examples, libraries 1138 may provide one or more APIs serviced by a message oriented middleware.

The frameworks 1118 (also sometimes referred to as middleware) may provide a higher-level common infrastructure that may be utilized by the applications 1120 and/or other software components/modules. For example, the frameworks 1118 may provide various GUI functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built-in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a Field Programmable Gate Array ("FPGA") or an Application-Specific Integrated Circuit ("ASIC")) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 12:
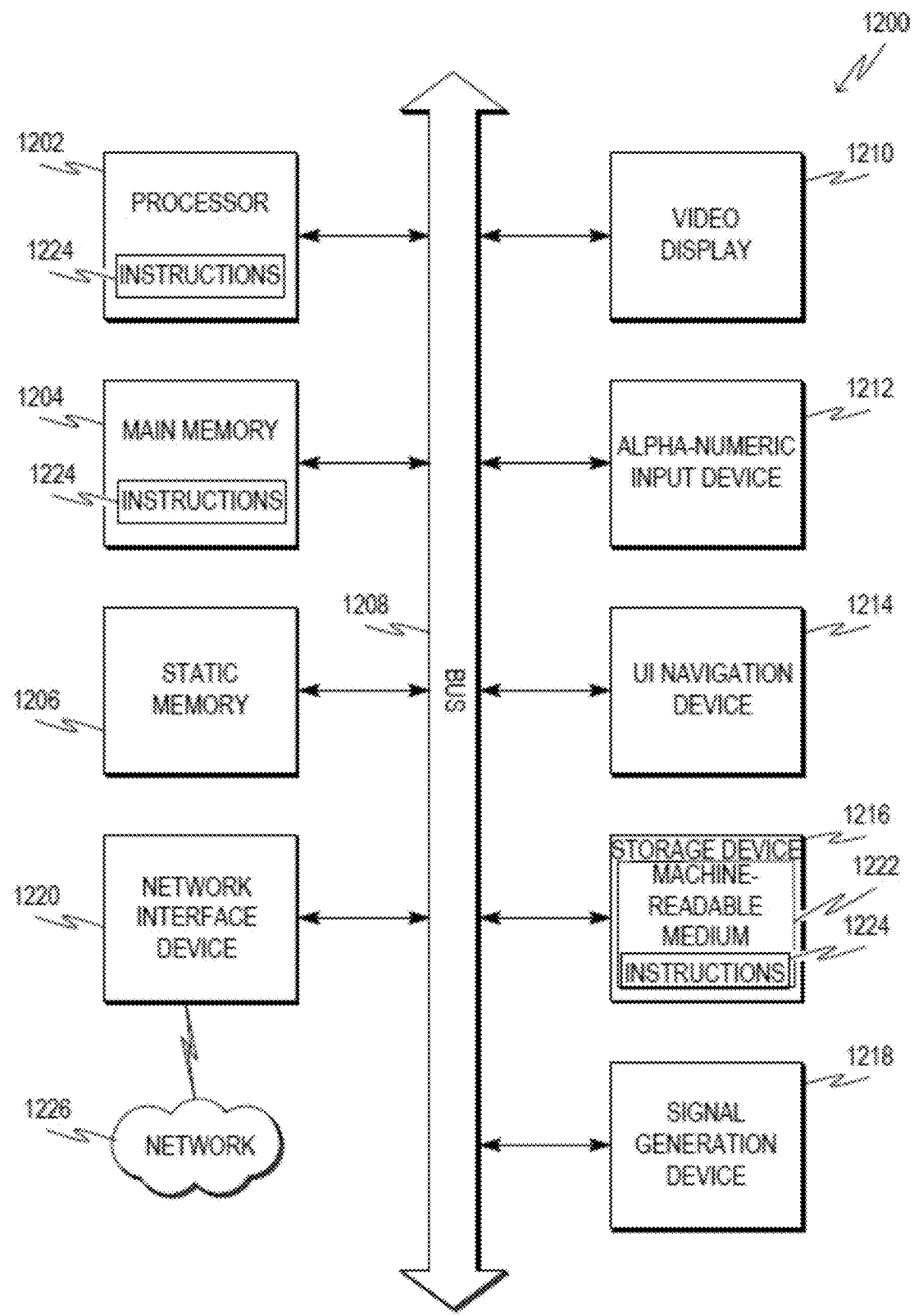
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer ("PC"), a tablet PC, a set-top box, a Personal Digital Assistant ("PDA"), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a Central Processing Unit ("CPU"), a graphics processing unit, or both), a main memory 1204, and a static memory 1206, which communicate with each other via a bus 1208. The computer system 1200 may further include a video display unit. The computer system 1200 also includes an alphanumeric input device 1212 (e.g., a keyboard or a touch-sensitive display screen), a UI navigation (or cursor control) device 1214 (e.g., a mouse), a disk drive unit 1216, a signal generation device 1218 (e.g., a speaker), and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., Erasable Programmable Read-Only Memory ("EPROM"), Electrically Erasable Programmable Read-Only Memory ("EEPROM"), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a Local Area Network ("LAN"), a Wide Area Network ("WAN"), the Internet, mobile telephone networks, Plain Old Telephone Switching ("POTS") networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Figure 13:
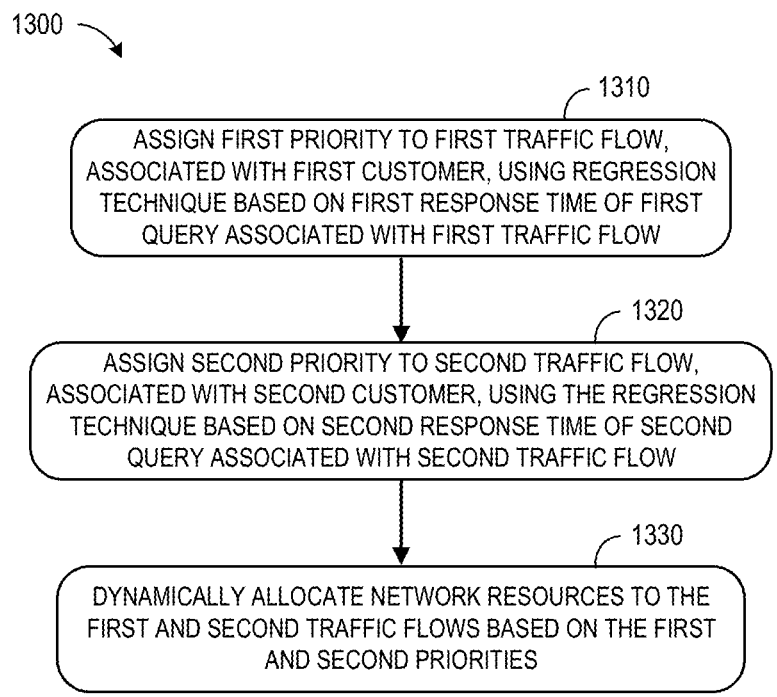
FIG. 13 is a method of allocating resources according to some embodiments.

Embodiments may utilize such a computer system to provide network multi-tenancy for cloud based ERP solutions. For example, FIG. 13 is a method 1300 of allocating resources according to some embodiments. At 1310, a system associated with multi-tenant software defined data center network traffic management may assign a first priority to a first traffic flow, associated with a first customer, using a regression technique based on a first response time of a first query associated with the first traffic flow. At 1320, the system may assign a second priority to a second traffic flow, associated with a second customer, using the regression technique based on a second response time of a second query associated with the second traffic flow. At 1330, the system may dynamically allocate network resources to the first and second traffic flows based on the first and second priorities. The software defined data center network may be associated with, for example, ERP solution deployed via a cloud environment and provided to the first and second customers using software as a service. Moreover, the regression technique of 1310, 1320 may associated with a GRNN that receives at least one of the following as inputs: a difference between the response time and a queue time, a wait time, a CPU time, a database request time, a virtual machine container time, an amount of memory used, an amount of data transferred to memory, etc. The response times may be associated with, for example, a wait for work process time, a processing time, a generation time, a load time, an enqueue time, a roll wait time, etc. According to some embodiments, the dynamic allocation of network resources is to improve network bandwidth utilization at the network layer with respect to multi-tenancy.

Figure 14:
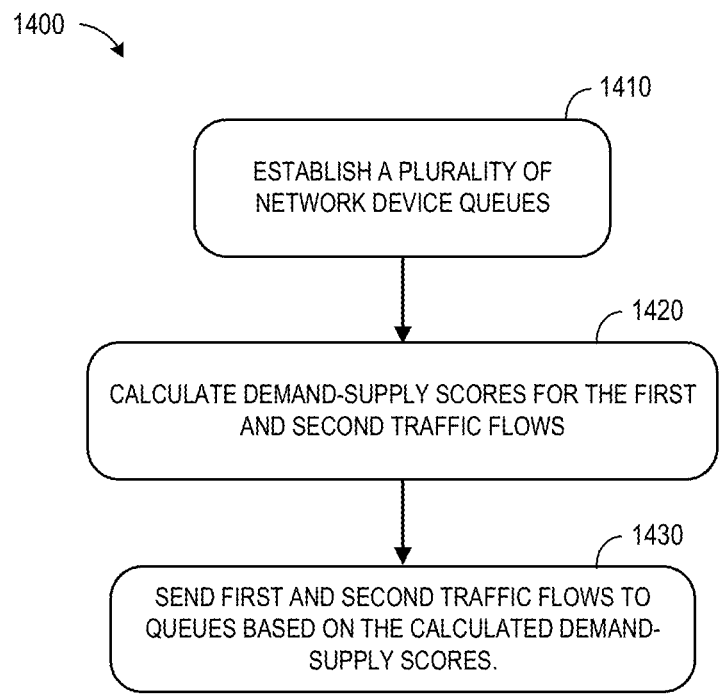
FIG. 14 is a method to utilize supply and demand parameters in accordance with some embodiments.

FIG. 14 is a method 1400 to utilize supply and demand parameters in accordance with some embodiments. At 1410, the system may establish a plurality of network device queues. At 1420, the system may calculate demand-supply scores for the first and second traffic flows. This might be performed, for example, using algorithms 1 and 2 described herein. At 1430, the system may send the first and second traffic flows to queues based on the calculated demand-supply scores.

Figure 15:
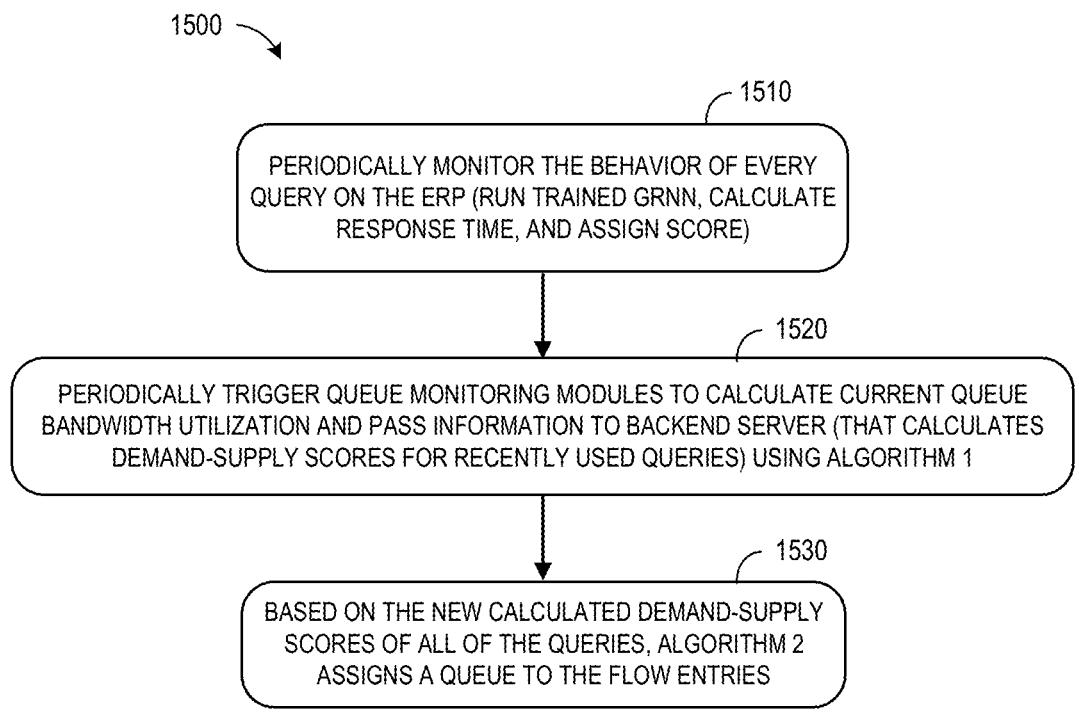
FIG. 15 is a more detailed method utilizing supply and demand parameters according to some embodiments.

FIG. 15 is a more detailed method 1500 utilizing supply and demand parameters according to some embodiments. At 1510, the system may periodically monitor the behavior of every query on the ERP (e.g., by running a trained GRNN, calculating a response time, and assigning a score). At 1520, the system may periodically trigger queue monitoring modules to calculate a current queue bandwidth utilization and pass this information to a backend server (that calculates demand-supply scores for recently used queries) using algorithm 1. At 1530, based on the new calculated demand-supply scores of all queries, the system may use algorithm 2 to assign a queue to the flow entries.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Figure 16:
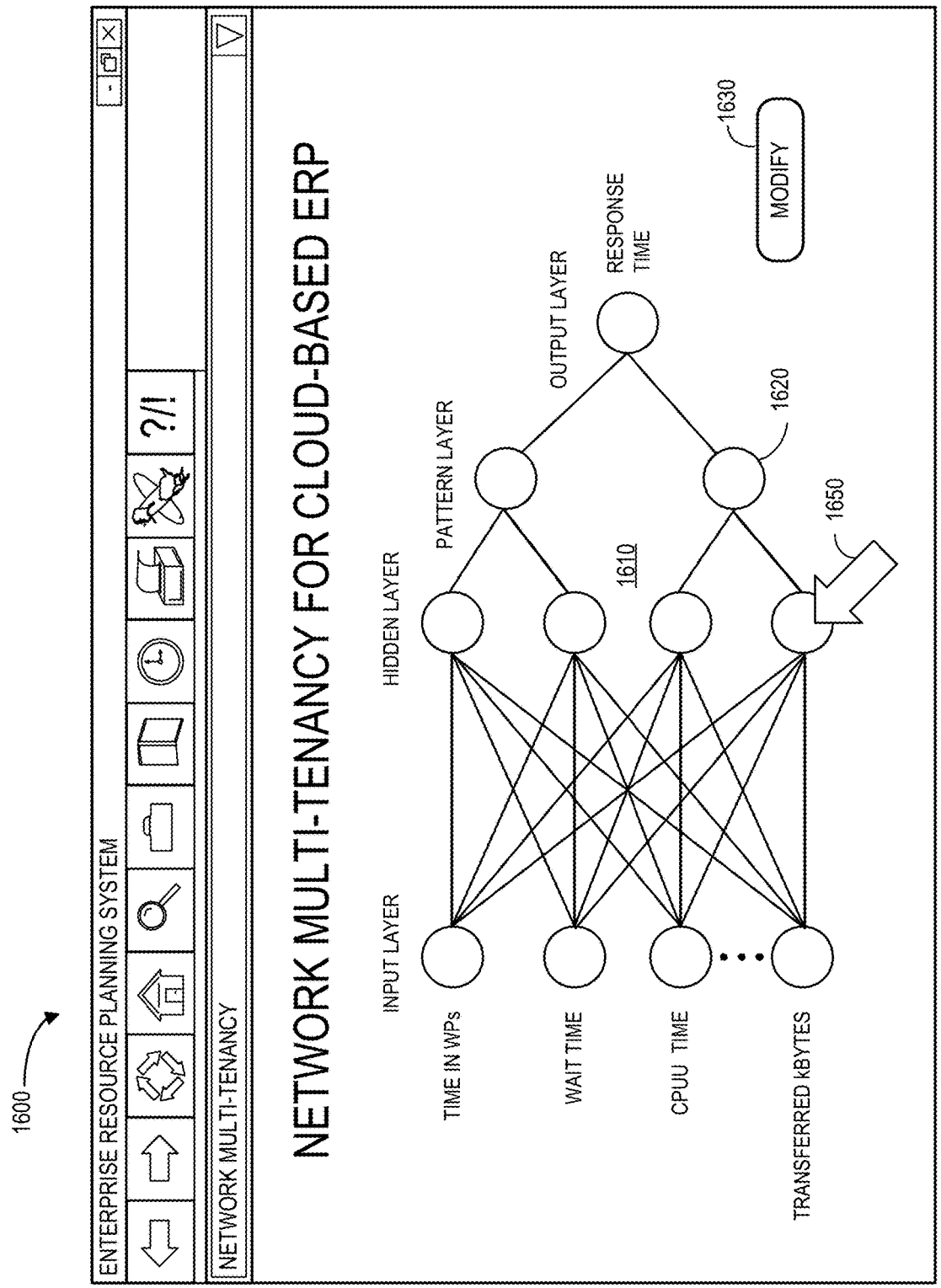
FIG. 16 is a multi-tenancy for cloud based ERP display in accordance with some embodiments.

Some embodiments have been described with respect to ERP solutions but embodiments may be associated with other types of cloud based data center solutions. Moreover, information may be provided (e.g., to an operator or administrator) in any number of different ways. For example, FIG. 16 illustrates an interactive Graphical User Interface ("GUI") display 1600 that might display information about network multi-tenancy for a cloud based ERP according to some embodiments. The display 1600 includes a graphic representation 1610 of elements of a data center (e.g., GRNN nodes 1620). Selection of portions of the graphic representation (e.g., by touchscreen or computer mouse pointer 1650) may result in the display of additional information about an element and/or allow an operator to adjust a parameter associated with the data center. Selection of a "Modify" icon may also let the user alter operation of the data center (e.g., by changing a number of available queues, altering response time input parameters or associated weights, etc.).

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system associated with multi-tenant software defined data center network traffic management, comprising:
   a data center computing system comprising at least one processor and at least one memory in communication with the at least one processor, wherein the data center computing system is programmed to perform operations including:
   assigning a first priority to a first traffic flow, associated with a first customer, using a regression neural network to predict a first response time of a first query associated with the first traffic flow;
   assigning a second priority to a second traffic flow, associated with a second customer, using the regression neural network to predict a second response time of a second query associated with the second traffic flow; and
   dynamically allocating network resources, for an Enterprise Resource Planning ("ERP") solution deployed via a cloud environment and provided to the first and second customers using Software as a Service ("SaaS"), to the first and second traffic flows based on the first and second priorities.

2. The system of claim 1, wherein the regression neural network is associated with a General Regression Neural Network ("GRNN").

3. The system of claim 2, wherein the GRNN receives at least one of the following as inputs: (i) a difference between the response time and a queue time, (ii) a wait time, (iii) a central processing unit time, (iv) a database request time, (v) a virtual machine container time, (vi) an amount of memory used, and (vii) an amount of data transferred to memory.

4. The system of claim 1, wherein the response times are associated with at least one of: (i) a wait for work process time, (ii) a processing time, (iii) a generation time, (iv) a load time, (v) an enqueue time, (vi) a roll wait time.

5. The system of claim 1, wherein the dynamic allocation of network resources is to improve network bandwidth utilization at the network layer with respect to multi-tenancy.

6. The system of claim 1, wherein the performed operations further include:
establishing a plurality of network device queues;
calculating demand-supply scores for the first and second traffic flows; and
sending the first and second traffic flows to queues based on the calculated demand-supply scores, wherein the first traffic flow is associated with a premium customer, the second traffic glow is associated with a non-premium customer, and different demand-supply score calculations are applied for the two customers.

7. A method for web application network management, the method comprising:
assigning, by a data center computing system, a first priority to a first traffic flow, associated with a first customer, using a regression neural network to predict a first response time of a first query associated with the first traffic flow;
assigning a second priority to a second traffic flow, associated with a second customer, using the regression neural network to predict a second response time of a second query associated with the second traffic flow; and
dynamically allocating network resources, for an Enterprise Resource Planning ("ERP") solution deployed via a cloud environment and provided to the first and second customers using Software as a Service ("SaaS"), to the first and second traffic flows based on the first and second priorities.

8. The method of claim 7, wherein the regression neural network is associated with a General Regression Neural Network ("GRNN").

9. The method of claim 8, wherein the GRNN receives at least one of the following as inputs: (i) a difference between the response time and a queue time, (ii) a wait time, (iii) a central processing unit time, (iv) a database request time, (v) a virtual machine container time, (vi) an amount of memory used, and (vii) an amount of data transferred to memory.

10. The method of claim 7, wherein the response times are associated with at least one of: (i) a wait for work process time, (ii) a processing time, (iii) a generation time, (iv) a load time, (v) an enqueue time, (vi) a roll wait time.

11. The method of claim 7, wherein the dynamic allocation of network resources is to improve network bandwidth utilization at the network layer with respect to multi-tenancy.

12. The method of claim 7, further comprising:
establishing a plurality of network device queues;
calculating demand-supply scores for the first and second traffic flows; and
sending the first and second traffic flows to queues based on the calculated demand-supply scores.

13. A non-transitory, machine-readable medium comprising instructions thereon that, when executed by a processor, cause the processor to execute operations comprising:
assigning, by a data center computing system, a first priority to a first traffic flow, associated with a first customer, using a regression neural network to predict a first response time of a first query associated with the first traffic flow;
assigning a second priority to a second traffic flow, associated with a second customer, using the regression neural network to predict a second response time of a second query associated with the second traffic flow; and
dynamically allocating network resources, for an Enterprise Resource Planning ("ERP") solution deployed via a cloud environment and provided to the first and second customers using Software as a Service ("SaaS"), to the first and second traffic flows based on the first and second priorities.

14. The medium of claim 13, wherein the regression neural network is associated with a General Regression Neural Network ("GRNN").

15. The medium of claim 14, wherein the GRNN receives at least one of the following as inputs: (i) a difference between the response time and a queue time, (ii) a wait time, (iii) a central processing unit time, (iv) a database request time, (v) a virtual machine container time, (vi) an amount of memory used, and (vii) an amount of data transferred to memory.

16. The medium of claim 13, wherein the response times are associated with at least one of: (i) a wait for work process time, (ii) a processing time, (iii) a generation time, (iv) a load time, (v) an enqueue time, (vi) a roll wait time.

17. The medium of claim 13, wherein the operations further comprise:
establishing a plurality of network device queues;
calculating demand-supply scores for the first and second traffic flows; and
sending the first and second traffic flows to queues based on the calculated demand-supply scores.

* * * * *